(No Model.)
E. SHAW.
PINKING OR SCALLOPING MACHINE.
No. 340,373. Patented Apr. 20, 1886.
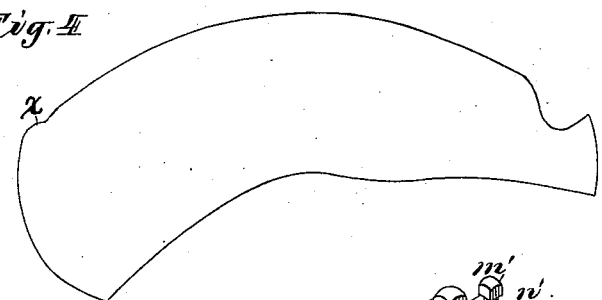
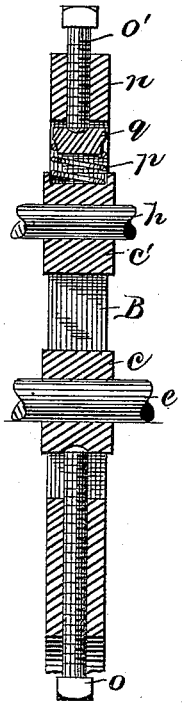
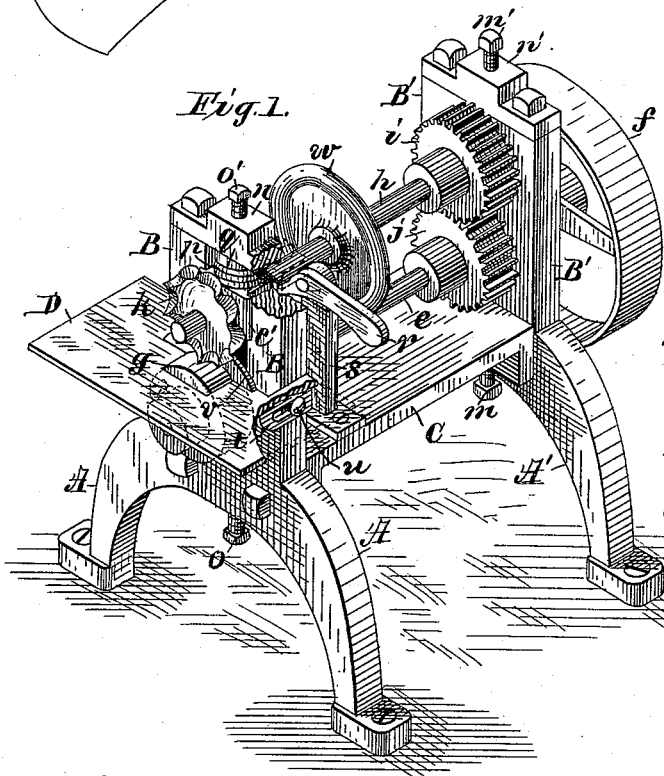
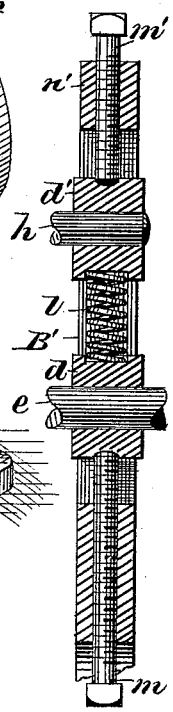
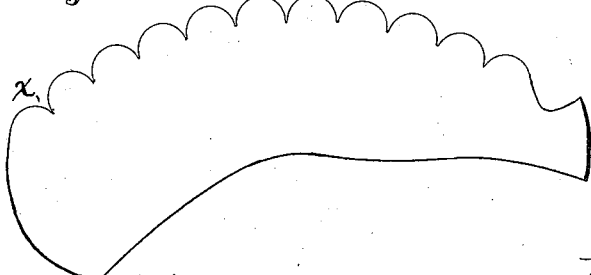
Witnesses
G. M. Gridley
M. J. Schinner
Inventor
Elijah Shaw
By Erwin & Benedict
Attorneys

United States Patent Office.

ELIJAH SHAW, OF MILWAUKEE, WISCONSIN.

PINKING OR SCALLOPING MACHINE.

SPECIFICATION forming part of Letters Patent No. 340,373, dated April 20, 1886.

Application filed July 1, 1885. Serial No. 170,358. (No model.)

*To all whom it may concern:*

Be it known that I, ELIJAH SHAW, of Milwaukee, in the county of Milwaukee and State of Wisconsin, have invented new and useful Improvements in Pinking or Scalloping Machines; and I do hereby declare the following to be a full, clear, and exact description of said invention, reference being had to the accompanying drawings, and to the letters or figures of reference marked thereon, which form a part of this specification.

My invention, to be hereinafter distinctly claimed, relates to a machine for pinking, scalloping, or cutting ornamental borders or designs in leather, woven fabrics, or other material; and this device is especially adapted to cutting scallops or segmental curves on the edge of the fly of the vamp of button boots or shoes.

In the accompanying drawings, Figure 1 is a perspective view of a machine embodying my invention for pinking as constructed for cutting the borders on the fly of the vamp of a boot. Fig. 2 is a vertical cross-section of that end of the machine shown in Fig. 1 which is adjacent thereto in said Fig. 1. Fig. 3 is a vertical cross-section of the end of the machine opposite to that shown in Fig. 2. Fig. 4 is the fly of a vamp before the border has been cut in my machine. Fig. 5 is the same fly of a vamp after the border has been cut by my machine.

The same letters refer to like parts in all the views.

The machine shown in Fig. 1 is supported on a frame consisting of two pairs, A A', of bifurcate legs, the feet of which may, for stability, be attached to the floor or table with screws or otherwise. These legs A A' are each provided with rigid upright standards B B', and are attached to each other by the horizontal plate C, extending between them and attached rigidly at its respective ends to said legs or standards. The standards B and B' are provided with central vertical slots, in which the journal-bearing blocks $c\ c'$ and $d\ d'$ are supported and have vertical movement. The horizontal driving-shaft $e$ passes through and has its bearings in the blocks $c$ and $d$, and is provided on its outer end with the friction driving-pulley $f$, by and through which motion is communicated to the machine from the power-supplying mechanism.

Rigid on the inner end of the shaft $e$ is the short solid cylinder $g$, the periphery of which cylinder is a smooth plain surface, intended for a support, upon and against which the corrugated knife, hereinafter to be described, is adapted to impinge and cut the leather or other material.

Above the driving-shaft $e$, and parallel thereto, is the knife-carrying shaft $h$, which passes through and has its journal-bearings in the blocks $c'$ and $d'$. This shaft $h$ is provided with a toothed wheel, $i$, rigid thereon, which wheel meshes with a corresponding toothed wheel, $j$, rigid on the driving-shaft $e$.

On the outer end of the shaft $h$, and rigid thereto, is a wheel or disk, the periphery of which is corrugated and made sharp, forming the knife $k$, adapted to cut the leather or other material as required. The peripheral knife-edge of this disk may instead be constructed in other forms than corrugations, so as to cut any design desired.

Between the blocks $d$ and $d'$ is placed the outwardly-pressing coiled spring $l$, while the inwardly-pressing set-screws $m$ and $m'$ bear against said blocks $d$ and $d'$ from below and above, respectively, the screw $m$ passing upwardly through and turning in the bottom of the standard B', and the set-screw $m'$ passing downwardly through and turning in a cap, $n'$, affixed on the top of the standard B'.

By means of the spring $l$ and set-screws $m$ and $m'$ the shafts $e$ and $h$ can be readily adjusted with reference to their distance from each other, so as to secure a proper meshing of the wheels $i$ and $j$. The journal-block $c$ is supported on the top end of the set-screw $o$, and may be adjusted up or down vertically by this set-screw turning in the bottom of the standard B.

Between the journal-block $c'$ and the set-screw $o'$ is placed the outwardly-pressing coiled spring $p$, the tension of which can be readily adjusted by means of the set-screw $o'$ passing downwardly through and turning in the cap $n$, rigid on the standard B. A small block, $q$, is interposed between the spring $p$ and set-screw $o'$ to receive the adjacent ends of each.

When in use, the knife k is intended to impinge against the cylinder g, and the force with which the knife is held against this cylinder may be conveniently regulated by means of the spring p and set-screw o'.

Just in the rear of the standard B the small hand-lever r is pivoted to the top of a post, s, rigid on the plate C. The short inner arm of this lever r is beneath, and rests upwardly against the shaft h, and by depressing the outer end of this lever the knife-carrying end of this shaft will be elevated, thus raising the knife away from the cylinder g, which it is convenient sometimes to do, either for inserting the material beneath the knife or changing the knife on its shaft. The horizontal apron D is attached to the standard B by means of flanges t, rigid thereto underneath, which flanges are provided with slots through which the set-screws u pass turning in the standard B, by and through which slots and set-screws the apron may be adjusted horizontally nearer to or farther from the standard B, as desired. This apron is intended for a support upon which to place the material to be cut, and is located a little below the top of the cylinder g, the apron having an aperture therein through which the cylinder projects upwardly a little above the top surface of the apron. Rigid at its ends on the apron and inside of the knife k is the upwardly-projecting arched guide v, against which the edge of the material may be pressed as it passes through the machine. The nearness of this guide to the knife may be regulated by adjusting the apron in or out from standard B, as hereinbefore described. Should it happen with long use of this machine that the knife cuts a crease or channel in the surface of the cylinder, the knife may be moved a little farther on or off its shaft, thus adjusting it opposite to a new smooth surface on the cylinder, against which the knife will cut smoothly, as at first.

To use my device, the driving-shaft e is caused to rotate by a belt running on the friction-pulley f, whereby also the shaft h, by and through the wheels i and j, is caused to rotate in an opposite direction, and the material to be cut being inserted between the knife k and the cylinder g is by the opposite and inward rotation of the knife and cylinder continuously fed to the machine while being pinked or scalloped.

In Fig. 4 is shown in outline the fly of a vamp of a button boot or shoe as it is cut out from the leather, and in which the first scallop x is partly cut, so that in putting the leather under the knife the scallops may be started at the proper and exact location to secure the desired number of scallops on the edge of the fly, and also to have the scalloping terminate at the proper place near the other extremity of the fly. If the knife k is not at the point of its revolution to commence the cutting of a scallop correctly, the knife may be rotated slightly by hand by and through the hand-wheel w, rigid on shaft h for that purpose.

Fig. 5 shows in outline the fly after the ornamental corrugated border has been cut on it by my device.

What I claim as new, and desire to secure by Letters Patent, is—

1. In a pinking or scalloping machine, a circular corrugated knife, k, rigid on and rotating with shaft h, and shaft h, in combination with cylinder g, rigid on and rotating with shaft e, and a supporting-frame in which said shafts have their bearings, one of said shafts being rotated by power supplied directly from the power-supplying mechanism, and the other shaft being rotated by power received from the first shaft by and through pinions on each shaft gearing with each other or equivalent means, substantially as described.

2. The corrugated knife-edged disk k, centrally rigid on shaft h, shaft h, provided with toothed wheel i, and having journal-bearings in the vertically-moving blocks c' and d', and the cylinder g, centrally rigid on the shaft e, shaft e, provided with toothed wheel j, meshing with wheel i, and driving-wheel f, and having journal-bearings in vertically-moving blocks c and d, in combination with the supporting-frame consisting of the legs A A', the plate C, and the upright standards B and B', in which standards said journal-blocks are supported and move, all substantially as and for the purpose set forth.

3. In a pinking or scalloping machine, the circular knife-carrying shaft h and its vertically-moving journal-block c', in combination with the set-screw o' and the spiral spring p, interposed between the set-screw and the journal-block c', substantially as and for the purpose described.

4. In a pinking or scalloping machine having a circular rotating knife, the knife-carrying shaft h and its vertically-moving journal-block c', in combination with the set-screw o', the spiral spring p, interposed between the set-screw o' and the journal-block c', the lever r, centrally pivoted and supported on the frame and having its short arm resting against the shaft h on its under side, and the supporting-frame, all substantially as set forth.

5. In a pinking or scalloping machine, the combination of the rotating knife k, the bearing-cylinder g, and the apron D, said apron being provided with the guide v and an aperture for the cylinder g, and being adjustable horizontally at right angles to the plane of motion of the knife k, all supported on the frame, substantially as and for the purpose set forth.

In testimony whereof I affix my signature in presence of two witnesses.

ELIJAH SHAW.

Witnesses:
C. T. BENEDICT,
G. M. GRIDLEY.